Feb. 7, 1939.   R. FICHTNER   2,146,569
HYDRAULIC GEAR ARRANGEMENT
Filed Sept. 10, 1936
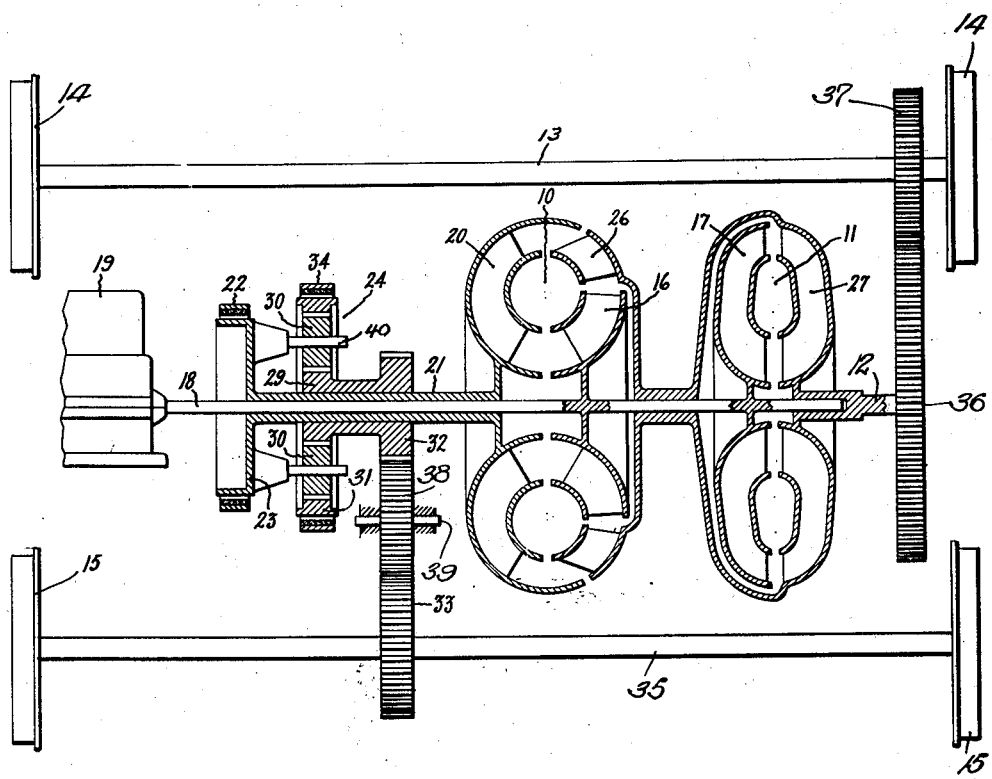
Inventor:
Rudolf Fichtner,
by Harry E. Dunham
His Attorney.

Patented Feb. 7, 1939

2,146,569

UNITED STATES PATENT OFFICE 2,146,569

HYDRAULIC GEAR ARRANGEMENT

Rudolf Fichtner, Berlin, Germany, assignor to General Electric Company, a corporation of New York Application September 10, 1936, Serial No. 100,122
In Germany October 31, 1935

8 Claims. (Cl. 105—96.2)

The present invention relates to hydraulic gear arrangements of the Föttinger type for operating vehicles, more specifically to the kind of arrangements which include special fluid operating circuits for the starting and normal operation. Heretofore it has been customary in this kind of arrangements to fill at one time only one circuit with liquid and to have the other circuit running idle while empty. The change or switching over from one circuit to the other accordingly necessitates the emptying of the one circuit and the filling of the other. This, however, causes not only loss of time but an undesirable instability and non-uniformity of the torque and the load on the motor. In addition, it requires a comparatively large pump for pumping the operating liquid.

The object of my invention is to provide an improved construction and arrangement of the type above specified whereby loss of time by changing from one operating circuit to the other is substantially eliminated. This is accomplished by the provision of a starting circuit which is filled at all times and an operating circuit which may be filled or emptied. With such an arrangement there will be always one circuit filled and accordingly in condition for operation so that the output of the liquid pump may be considerably reduced. In addition, as will be readily understood, the torque transmission in such an arrangement is never interrupted. With filled operating circuit the starting circuit, that is, the starting torque converter is disconnected by the provision of a device, such as a free-wheeling, permitting the guide wheel or member to rotate in the direction of the other wheels. In case a hydraulic coupling is used for the operating circuit, then the pump and turbine wheels of the starting torque converter run at substantially equal speed so that with a movable guide wheel practically no losses occur.

With my invention such an arrangement may be applied advantageously to drives including a starting torque converter for driving separate vehicle axles whereby one axle is driven continuously by the turbine wheel and the other temporarily by the oppositely rotating guide wheel.

In accordance with a further feature of the invention the simultaneous application of the partial filling and the connecting and disconnecting of a second vehicle axle is accomplished by the use of the same guide wheel in three different connections or operating steps. The guide wheel runs backward during the first operating step; in the second operating step the guide wheel is separated and prevented from rotation, and in the third step, that is, after the operating torque converter has been filled, the guide wheel rotates freely without transmitting torque.

The driving connection with the axle is preferably accomplished by means of a planetary gear which includes a brake mechanism for braking one of its parts. In the first step this brake is applied to establish a driving connection between the guide wheel and its axle. In the second operating step the brake is released but another brake is applied to a disc which carries the intermediate gears of the planetary gearing so as to hold the guide wheel stationary while the axle rotates freely by action of the planetary gear. In the third operating step both the primary and secondary part of the planetary gear are released.

For a better understanding of what I believe to be novel and my invention, attention is directed to the single figure of the accompanying drawing illustrating a vehicle hydraulic gear drive embodying my invention.

The hydraulic gear arrangement includes a torque converter 10 and a hydraulic coupling 11, both of the Föttinger type described fully in U. S. Patents 1,999,359 and 1,999,360 issued to Föttinger. In addition, the arrangement includes gear trains for driving vehicle axles 13 and 35 and wheels 14 and 15 respectively. The torque converter and coupling have pump wheels 16 and 17 which are secured to and driven by a drive shaft 18 from a suitable motor 19. The torque converter has a guide wheel 20 which is connected by a sleeve 21 surrounding the shaft 18 to a brake mechanism 22 having a disk 23 and to a planetary gearing 24. The torque converter 10 and the coupling 11 have turbo wheels 26 and 27 respectively mechanically secured together and connected to a driven shaft 12 which is geared to the axle 13 by gear 36 mounted on shaft 12 and gear 37 mounted on the axle 13. The planetary gearing includes an inner gear 29, intermediate gears 30 and an outer gear 31. The gear 29 is mechanically secured to a gear 32 which is one of the gears in the gear train connected to drive axle 35. The other gears in this train are gear 38 mounted on a stub shaft 39 and a gear 33 mounted on the axle 35. The gears 32, 38, and 33 cooperate with each other to drive the axle 35 when rotated by guide wheel 20 in the same direction as axle 13 is driven by shaft 12. The outer gear 31 of the planetary gear 24 may be held stationary by any suitable means, in the present instance indicated as a known type of brake mechanism 34. The intermediate gears 30 are rotatable about shafts 40 which are secured to the disk 23 and through hollow shaft 21 to the guide wheel 20. This assembly may be stopped by application of the brake mechanism 22 to the periphery of disc 23.

The operation of the arrangement is as follows: The torque converter 10 is always filled, whereas the coupling 11 is filled only during the third operating step but empty during the first and second step. In step one, the brake 34 is applied to hold stationary the ring gear 31 of the planetary gearing 24. The motor 19 then drives through its shaft 18, the pump wheels 16 and 17, and sets into motion the fluid in the torque converter 10. This fluid acts against the turbo wheel 26 and reacts against the guide wheel 20. The two wheels are thereby driven in opposite directions and transmit their energy to the driving axles 13 and 35 respectively. The turbo wheel 26 transmits its energy through the casing of the coupling 11, shaft 12, and gears 36, 37 to the axle 13. The guide wheel 20 transmits its energy through hollow shaft 21, disc 23, shafts 40 of the intermediate gears 30, the inner gear 29 and the gears 32, 38 and 33 to axle 35. In view of the fact that the two axles are connected to each other through the wheels 14 and 15 traveling on common track rails, the speeds of the guide wheel 20 and turbo wheel 26 will be alike or proportioned in accordance with the gear ratios used, this latter depending upon the conditions in the torque converter. In the second operating step the brake mechanism 34 is released and the other brake mechanism 22 including the disk 23 is applied to hold stationary the guide wheel 20. With the guide wheel 20 held stationary, the energy of the pump wheel is transmitted to the turbo wheel 26 which then applies its energy through the gears 36 and 37 to axle 13. No driving force is applied in this operating step to the axle 35. It is free to rotate, however, since the intermediate gears 30 are free to rotate about their shafts 40, and the ring gear 31 is free to rotate inside of the brake ring 34. With this arrangement, the turbo wheel 26 moves at a greater speed than in the first operating step and drives the axle 13 at a correspondingly higher speed. The torque applied to the axle is correspondingly smaller. In the third operating step the coupling 11 is filled with operating liquid and the brake disk 23 is released so that the guide wheel 20 may rotate freely. The coupling 11 in this step transmits all the power of the motor 19 to the axle 12, and the elements of the torque converter 10 float freely along with the movement of the axle 13. The circulation of a fluid in the torque converter does not transmit energy to the axle 13, and on the other hand, substantially no energy is lost, since the guide wheel moves freely in the converter casing and fluid therein is not hindered from moving along with the turbo and pump wheels which move at substantially the same speed along with the wheels of the coupling.

What I claim as new and desire to secure by Letters Patent of the United States, is,—

1. Hydraulic gear arrangement of the Föttinger type for operating multi-axle vehicles including the combination of a turbo type torque converter element, a hydraulic coupling element, each of said elements having a turbo wheel, a driven shaft mechanically secured to both turbo wheels, each of said elements having a pump wheel, a drive shaft secured to the pump wheels, the converter element including a guide wheel, means including another driven shaft and a planetary gearing mechanically connected to the guide wheel and to an axle of said vehicle and brake mechanisms for respectively effecting a drive connection between said guide wheel and said axle and alternately for holding the guide wheel stationary while said axle rotates freely through the operation of the planetary gearing.

2. Hydraulic gear arrangement of the Föttinger type for driving vehicles including the combination of a drive shaft, a first and a second driven shaft, a hydraulic torque converter continuously filled with operating liquid and comprising a pump wheel, a turbine wheel and a guide wheel, a hydraulic coupling comprising a pump wheel and a turbine wheel, the pump wheels of the torque converter and the coupling being mechanically rigidly secured to the drive shaft, the turbine wheels of both the torque converter and the coupling being mechanically secured to the first driven shaft, and means for transmitting torque from the guide wheel to the second driven shaft during the starting period and to permit free rotation of the guide wheel during normal operation comprising a disk mechanically connected to the guide wheel, a planetary gearing having an inner gear, intermediate gears and an outer gear with the intermediate gears supported on said disk and the inner gear connected to the second shaft means for holding said outer gear stationary during the torque transmitting period of said guide wheel and means associated with the disk to prevent rotation of the guide wheel while the second drive shaft rotates freely through said planetary gearing.

3. Hydraulic gear arrangement of the Föttinger type for driving vehicles including the combination of a drive shaft, a first and a second driven shaft, a hydraulic torque converter continuously filled with operating liquid and comprising a pump wheel, a turbine wheel and a guide wheel, a hydraulic coupling comprising a pump wheel and a turbine wheel, the pump wheels of the torque converter and the coupling being mechanically rigidly secured to the drive shaft, the turbine wheels of both the torque converter and the coupling being mechanically secured to the first driven shaft, and means for transmitting torque from the guide wheel to the second driven shaft during the starting period and to permit free rotation of the guide wheel during normal operation comprising a disk mechanically connected to the guide wheel, a planetary gearing having an inner gear, intermediate gears and an outer gear with the intermediate gears supported on said disk and the inner gear connected to the second shaft and means associated with the outer gear of the planetary gearing and with said disc to prevent rotation of said outer gear and thereby to effect transmission of torque from the disk to the inner gear and alternately, to prevent rotation of said disc to hold said guide wheel stationary and still permit free rotation of said axle.

4. In a hydraulic transmission, the combination of a torque converter provided with a pump wheel, a turbine wheel, a guide wheel, and a filling of operating liquid maintained therein continuously a coupling comprising a pump wheel and a turbine wheel connected in multiple with the pump and turbine wheels of said converter and a supply of operating liquid which is maintained therein only during normal running operation, a driving motor, a drive shaft connected between said driving motor and the pump wheels of said torque converter and said coupling, a pair of vehicle axles, a driving connection between the turbine wheels of said converter and said coupling and one of said axles, and a connection between said guide wheel and said second axle comprising a planetary gearing including a ring gear, intermediate gears, and an inner gear, and means for respectively holding stationary said ring gear and said intermediate gears which are connected to said guide wheel whereby in transmitting power between said motor and said axles, power is transmitted through said torque converted by holding said ring gear stationary, thereby establishing a driving connection between said guiding wheel and said turbo wheels to transmit energy to both of said axles respectively, and alternately said guide wheel may be held stationary thereby causing all the energy to be transmitted to the first axle through said converter turbo wheel while said second axle rotates freely and finally releasing said guide wheel to transmit power to said first axle through said coupling for normal running operation.

5. In a hydraulic transmission, the combination of a torque converter provided with a pump wheel, a turbine wheel, a guide wheel and a filling of operating liquid which is maintained therein continuously, a coupling comprising a pump wheel and a turbine wheel connected in multiple with the pump and turbine wheels of said converter and a supply of operating liquid maintained therein only during normal running operation, a driving motor, a drive shaft connected between said driving motor and the pump wheels of said torque converter and said coupling, a pair of vehicle axles, a driving connection between the turbine wheels of said converter and said coupling and one of said axles, and a connection between said guide wheel and the second one of said axles comprising a planetary gearing including a ring gear, intermediate gears, and an inner gear, and means for holding stationary said ring gear whereby in transmitting power between said motor and said axles power is transmitted through said torque converter by holding said ring gear stationary to establish a driving connection between said guide wheel and said second axle and thereby transmit energy to both of said axles respectively and to break said driving connection to allow said guide wheel to rotate freely and causing all energy to be transmitted to the first of said axles through said coupling for normal running operation.

6. In a hydraulic transmission, the combination of a torque converter provided with a pump wheel, a turbine wheel, a guide wheel and a filling of operating liquid maintained therein continuously, a coupling comprising a pump wheel, a turbine wheel and a supply of operating liquid which is withdrawn during the starting period connected in multiple with the pump and turbine wheels of said converter, a driving motor, a drive shaft connected between said driving motor and the pump wheels of said torque converter and said coupling, a pair of vehicle axles, a driving connection between the turbine wheels of said converter and said coupling and one of said axles, and a connection between said guide wheel and said second axle comprising a planetary gearing including a ring gear, intermediate gears, and an inner gear, and means for holding stationary said guide wheel during a starting period whereby in transmitting power between said motor and said axles power is transmitted through said converter while said guide wheel is held stationary and whereby power is transmitted only through said coupling while said guide wheel is permitted to rotate freely during normal running operation.

7. Hydraulic gear arrangement of the Föttinger type for driving vehicles including the combination of a drive shaft, a first and a second driven shaft, a hydraulic torque converter continuously filled with operating liquid and comprising a pump wheel, a turbine wheel and a guide wheel, a hydraulic coupling being filled with liquid only during normal operation and provided with a pump wheel and a turbine wheel, the pump wheels of the torque converter and the coupling being mechanically rigidly secured to the drive shaft, the turbine wheels of both the torque converter and the coupling being mechanically secured to the first driven shaft, means for transmitting torque from the guide wheel to the second driven shaft during the first starting period, means for disconnecting the guide wheel from said second driven shaft and for holding the guide wheel stationary during the second starting period, said last mentioned means being operated to release said guide wheel during a third period which is the normal operating period to permit free rotation of said guide wheel.

8. In a hydraulic gear arrangement of the Föttinger type for driving vehicles the combination of a pair of vehicle axles, a starting circuit in the form of a torque converter connected to drive the first of said axles and provided with a guide wheel, said torque converter being continuously filled with operating liquid, an operating circuit connected in multiple with said starting circuit including a hydraulic coupling which is filled and transmits power to said first axle only during normal operation, means for establishing a driving connection for the said guide wheel during the starting operation to the said second vehicle axle and thereby transmitting power through said converter to both of said axles at a high torque, means for disconnecting said guide wheel from said second axle in the second step of the starting operation and for holding the guide wheel stationary during the second operating step for transmitting power at a lower torque to said first axle, said last mentioned means being operable to release the guide wheel in the final operating step to transmit substantially no power through said converter to said second axle whereby all power is transmitted to said first axle through said coupling which is filled during this operation.

RUDOLF FICHTNER.